United States Patent [19]

Hansen

[11] Patent Number: 5,509,665
[45] Date of Patent: Apr. 23, 1996

[54] LUGE SLED

[75] Inventor: Geir S. Hansen, Denver, Colo.

[73] Assignee: Viking Imports, Inc., Denver, Colo.

[21] Appl. No.: 245,047

[22] Filed: May 17, 1994

Related U.S. Application Data

[63] Continuation-in-part of Ser. No. 3,312, Jan. 6, 1993, Pat. No. Des. 346,988.

[51] Int. Cl.$^6$ .................................................. B62B 13/00
[52] U.S. Cl. ........................... 280/22.1; 280/28; 280/21.1
[58] Field of Search .................................. 280/19, 28, 16, 280/17, 22.1, 18, 28.11, 811, 816, 21.1

[56] References Cited

U.S. PATENT DOCUMENTS

| | | | |
|---|---|---|---|
| 350,066 | 9/1886 | Leslie | 280/18 |
| 363,157 | 5/1887 | McLaren | 280/18 |
| 368,802 | 8/1887 | Allen | 280/16 |
| 375,042 | 12/1887 | Blesh | 280/18 |
| 500,623 | 7/1893 | Smith | 280/16 |
| 1,260,920 | 3/1918 | Leach . | |
| 1,447,472 | 1/1922 | Hruska | 280/28 |
| 1,909,062 | 5/1933 | Maneval . | |
| 2,104,263 | 1/1938 | Lyons | 280/16 |
| 2,357,928 | 9/1944 | Bowen et al. | 280/22 |
| 2,453,767 | 11/1948 | Thompson | 280/28 |
| 2,620,199 | 12/1952 | Maly et al. | 280/22.1 |
| 3,107,923 | 10/1963 | Nuss | 280/22.1 |
| 3,119,131 | 10/1963 | Yoder | 280/22.1 |
| 3,525,412 | 8/1970 | Erickson | 280/26 |
| 3,948,536 | 4/1976 | Konrad | 280/18 |
| 4,105,217 | 8/1978 | Metelon et al. | 280/28 |
| 4,326,725 | 4/1982 | Lagervall | 280/22.1 |
| 4,357,029 | 11/1982 | Marini et al. | 280/47.19 |
| 4,542,908 | 9/1985 | Muyskens | 280/28.11 |
| 4,591,174 | 5/1986 | White | 280/28 |
| 4,650,198 | 3/1987 | Sherretts | 280/18 |
| 4,705,247 | 11/1987 | Delmerico | 248/98 |
| 5,289,704 | 3/1994 | Johnson | 280/814 |
| 5,310,221 | 5/1994 | Schmidt | 280/816 |
| 5,333,885 | 8/1994 | Pullman | 280/47.19 |
| 5,348,322 | 9/1994 | Rauf et al. | 280/28.11 |

FOREIGN PATENT DOCUMENTS

| | | | |
|---|---|---|---|
| 46224 | 2/1911 | Australia | 280/28.11 |
| 1249950 | 11/1960 | France | 280/22.1 |
| 129636 | 2/1978 | Germany . | |
| 125655 | 7/1949 | Sweden . | |
| 852696 | 9/1981 | U.S.S.R. . | |

Primary Examiner—Eric D. Culbreth
Assistant Examiner—Min S. Yu
Attorney, Agent, or Firm—Sheridan Ross & McIntosh

[57] ABSTRACT

A luge sled having features which enhance performance and safety characteristics of the sled. The sled generally comprises a support structure for supporting a sled rider, at least two runners, a cavity, a mounting boss, and an elastomeric bushing positioned between the cavity and the mounting boss and including a body portion which substantially encloses the side surfaces of the mounting boss around the perimeter thereof. The elastomeric bushing may further include an end portion which substantially encloses the end surface of the mounting boss. The runners are molded from glass-reinforced plastic and are formed into an I-beam section. The runners also include a plurality of reinforcing ribs protruding from a side surface thereof. The runners include a front segment having a front surface which is generally vertically disposed. The sled includes front and rear bridge supports which are molded from glass-reinforced plastic and also include reinforcing ribs in a lower surface thereof. A securing member secures the support structure to the runners without applying excessive compressive forces between the side walls defining the cavity and the mounting boss.

33 Claims, 11 Drawing Sheets

LUGE SLED

RELATED APPLICATIONS

This application is a continuation-in-part of U.S. Ser. No. 003,312, filed Jan. 6, 1993, now U.S. Pat. No. D346,988, issued May 17, 1994, and entitled "SLED RUNNER".

FIELD OF THE INVENTION

The present invention generally relates to the field of sleds, such as those suitable for sliding on a snow or ice surface. More particularly, the present invention relates to a luge sled design which enhances one or more performance and safety characteristics of the sled.

BACKGROUND OF THE INVENTION

Luge sleds have been used for many years for both recreational and competitive purposes. Traditional luge design includes a supporting surface, for supporting the sled rider, and two runners mounted to the bottom of the supporting surface. The runners generally have an arcuately-shaped front portion terminating at a runner horn. Steering of the luge is accomplished by applying a lateral force (e.g., by pushing with the rider's legs) to the runner horn to laterally flex the interface between the runner and the support surface. Runners have been manufactured from wood laminated with a steel sole to provide a low-friction, long-lasting running surface.

Although traditional luge designs perform satisfactorily under a wide range of conditions, such luge sleds can be uncomfortable and can be difficult to use, especially for the novice rider. Further, traditional luge sleds tend to be heavy (e.g., as much as 44 pounds) due to the large amount of metal and wood utilized in their design. Such larger sleds can also have a limited useful life span and can require frequent maintenance due to corrosion of steel components and/or splintering, warping or rotting of wood components. In addition, traditional luge sleds tend to take a long time to manufacture (e.g., about 5 hours or more per sled) due to the required welding of the support assembly and fabrication of a two-piece runner.

Consequently, it is an object of the present invention to provide a comfortable, easy-to-use luge sled which is particularly suitable for the recreational rider. It is another object of the present invention to decrease the weight of luge sleds and to decrease the maintenance costs associated with long-term usage of such sleds. It is yet another object of the present invention to decrease the manufacturing costs associated with fabrication of luge sleds by eliminating expensive and time consuming welding operations and reducing the number of parts associated with such sleds. The present invention is particularly suitable for sale as a kit for subsequent assembly by the user.

SUMMARY OF THE INVENTION

The present invention is embodied in a luge sled particularly adapted for recreational use on a snow surface. The described sled has features which individually and collectively enhance one or more characteristics of the sled.

The sled generally comprises a support structure for supporting a rider and two runners for providing a glide surface. The runners are secured to the support surface through the interconnection between a mounting boss and a cavity. An elastomeric bushing is positioned between the mounting boss and the cavity and includes a body portion having front and rear walls which are thicker than the corresponding side walls. Such varying wall thickness provides for easier turning of the sled.

In one embodiment, the elastomeric bushing further includes an end portion integral with the body portion of the elastomeric bushing. The end portion facilitates insertion of the bushing into the cavity without movement of the bushing relative to the mounting boss. The elastomeric bushing may comprise a foam rubber material (e.g., neoprene rubber) and preferably has a durometer of from about 50 to about 90, most preferably about 60.

The support structure preferably includes first and second bridge supports and at least two stabilizer bars pinned to the second bridge support and slidably engaged with the first bridge support. In one embodiment, the first bridge support is in front of the second bridge support. The bridge supports may be molded from a moldable material, such as plastic (e.g., glass-reinforced plastic), and may include a plurality of reinforcing ribs in a surface (e.g., a lower surface) thereof. In another embodiment, the bridges include an upper surface having an inner portion of a first radius and blended into outer portions of a second radius smaller than the first radius. The outer portions form raised ears (e.g., about 3 ¼ inches above the lowest point of the inner portion) which assist in providing lateral support to the rider, especially when the rider is maneuvering through sharp corners. The bridge supports may also comprise a solid panel between the upper and lower surfaces to provide further strength and stiffness to the bridge supports.

The stabilizer bars may comprise aluminum, such as a solid aluminum bar. In one embodiment, the stabilizer bars are secured to the rear bridge support via roll pins at an angle between about 5° and about 85° (preferably between about 20° and about 50°, more preferably about 35°) below horizontal. Such an angle facilitates pivoting of the stabilizer bar relative to the bridge support to improve handling characteristics of the sled.

Elastomeric bumpers are preferably provided on the rear portions of the stabilizer bars to cushion incidental contact of the stabilizer bars against foreign objects. In one embodiment, such elastomeric bumpers comprise neoprene rubber having a durometer of about 25.

In yet another embodiment, the cavity is at least partially defined by sidewalls and the sled further includes a securing member extending through the sidewalls, the bushing, and the mounting boss. The securing member includes means for limiting compressive forces on the sidewalls. For example, the securing member may include a threaded rod having a head on one end (e.g., a bolt) and a capped nut threadedly secured to the other end. The capped nut can only be threaded onto the bolt to a specified position, thereby limiting the amount of compression that can be applied by the capped nut and bolt to the sidewalls.

The runners each preferably include a rear segment interconnected with the support structure, an intermediate segment interconnected with said rear segment and having a generally arcuate configuration, and a front segment interconnected with said intermediate segment and having a front surface which is generally vertically disposed. To provide cushioning against front impacts, an elastomeric member (e.g., closed cell rubber having 25 durometer) may be positioned adjacent the front surface. Such elastomeric member may include a side portion which substantially encloses the side surface of the front segment around the perimeter thereof, thereby providing cushioning for the rider's legs. The elastomeric member preferably further includes an end portion which substantially encloses an end surface of the front segment.

To provide support to the rider's legs, the runners preferably each further include a supporting shoulder adjacent the front segment. The shoulder may be formed by making the width of the front segment narrower than the width of the intermediate segment, thereby positioning the supporting shoulder between the intermediate segment and the front segment of said runner. When such a shoulder is present in combination with an elastomeric member, the elastomeric member may further include a flange which rests against the shoulder to provide further support to the rider's legs.

The runners may be formed from plastic (e.g., glass-reinforced plastic) and preferably are formed into an I-beam configuration. The runners may include a plurality of reinforcing ribs in a surface (e.g., a side surface) thereof. Such ribs provide structural stiffness (e.g., lateral stiffness) to the runner without significantly affected the weight thereof. In one embodiment, the reinforcing ribs are positioned on the sides of the rear segment and are in a repeating, generally zig-zag pattern. In another embodiment, the ribs are present in the intermediate segment and form a repeating, generally criss-cross pattern (e.g., two zig-zag patterns staggered from each other). The ribs are preferably oriented such that a plurality of rib axes, defined along a longitudinal extent of each rib, intersect at a common point (e.g., on the front segment of the runners).

By virtue of the present invention, a luge sled design is provided which weights only about 14½ pounds (compared to about 44 pounds for a similarly-sized competition luge sled). Further, the luge sled of the present invention is more comfortable and is easier to use than previous designs. The sled is also easier to assemble, due to the elimination of expensive and time-consuming welds. Various features further enhance the safety characteristics of the sled.

DETAILED DESCRIPTION

Figure 1:
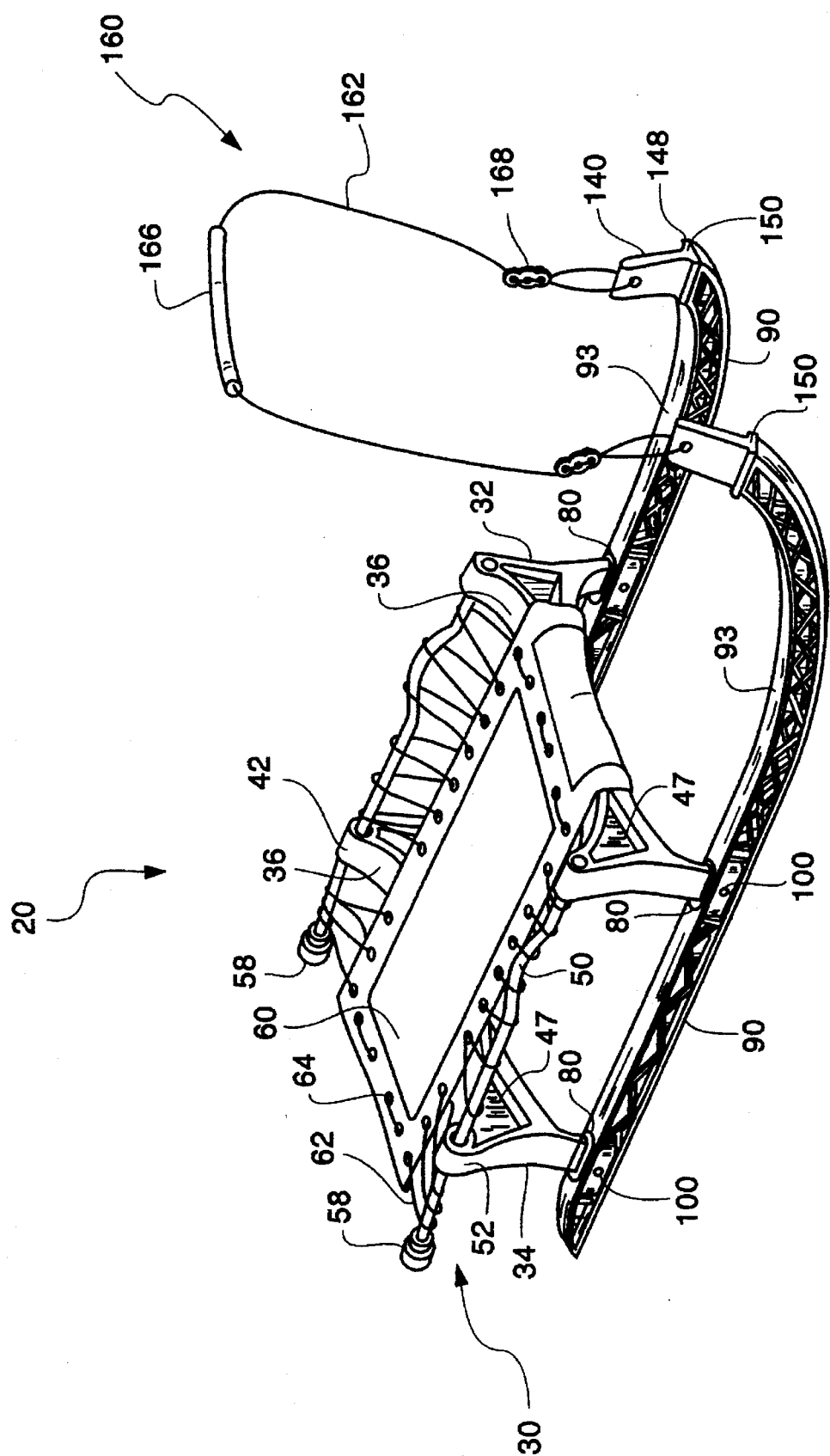
FIG. 1 is a perspective view of a luge sled embodying the features of the present invention.
Figure 2:
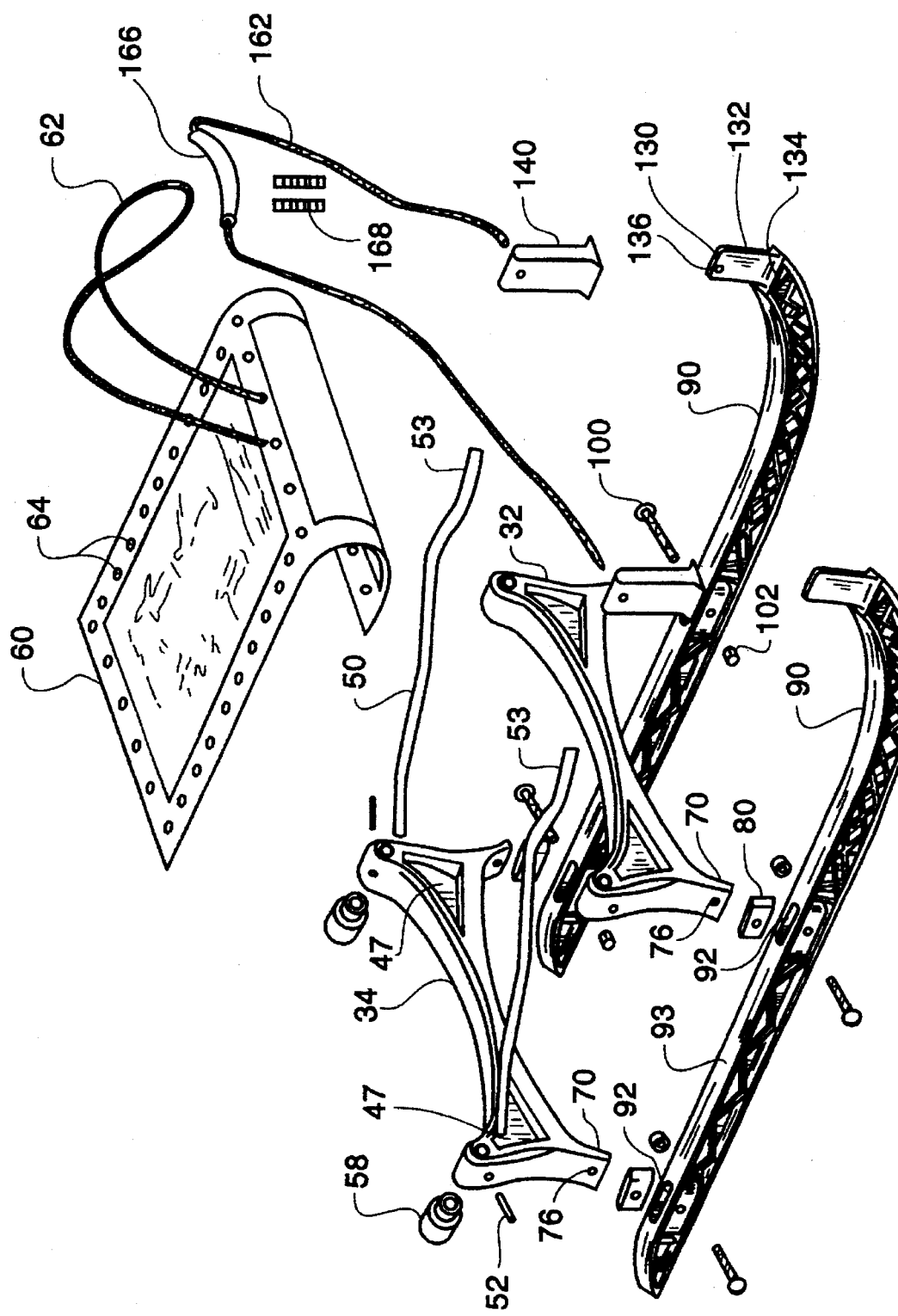
FIG. 2 is a perspective assembly drawing of the luge sled shown in FIG. 1.
Figure 3:
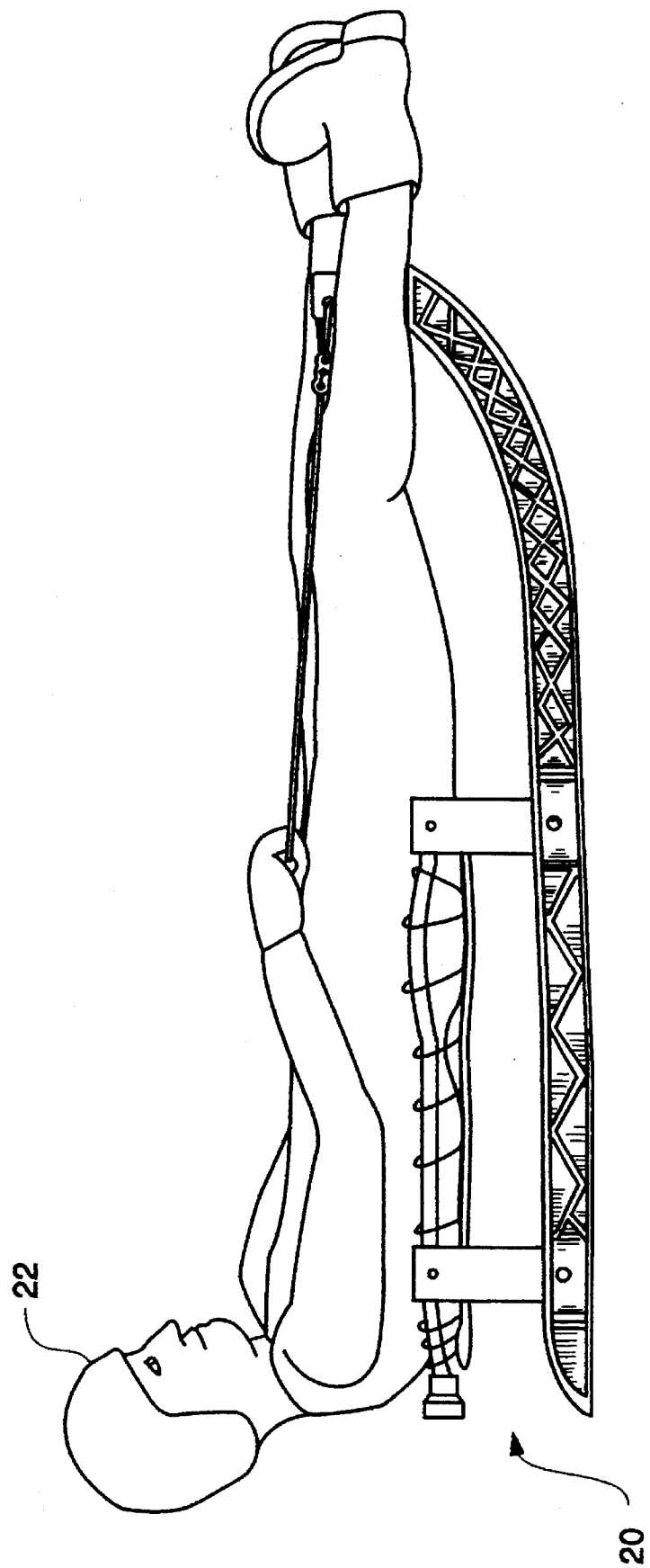
FIG. 3 is a side view of the luge sled shown in FIG. 1 with a rider mounted thereon.

The figures illustrate a luge sled 20 embodying the features of the present invention. FIGS. 1 and 2 illustrate the sled 20 in the assembled and disassembled conditions, respectively. The sled 20 generally comprises a support structure 30 for supporting a rider 22, as illustrated in FIG. 3. The support structure 30 is interconnected to two runners 90 which provide the gliding surface upon which the sled 20 will glide over a snowy or icy surface. A steering harness 160 is secured to the front portion of both runners 90 to assist in steering of the sled, to provide a means for pulling the sled, and to allow the sled to be hung from a hook.

The support structure 30 of the illustrated embodiment comprises front and rear bridge supports 32, 34 which provide the structural interconnection between the support structure 30 and the runners 90. The bridge supports 32, 34 of the illustrated embodiment are injection molded out of a moldable material, such a plastic, epoxy, or other suitable material. In the described embodiment, the moldable material comprises a fiber-reinforced plastic, such as Xenoy (a trademark of General Electric Co.) having about 30% glass fibers. For ease of manufacturing, the front and rear bridge supports 32, 34 are preferably identical to each other, thereby only requiring a single mold.

Figure 4:
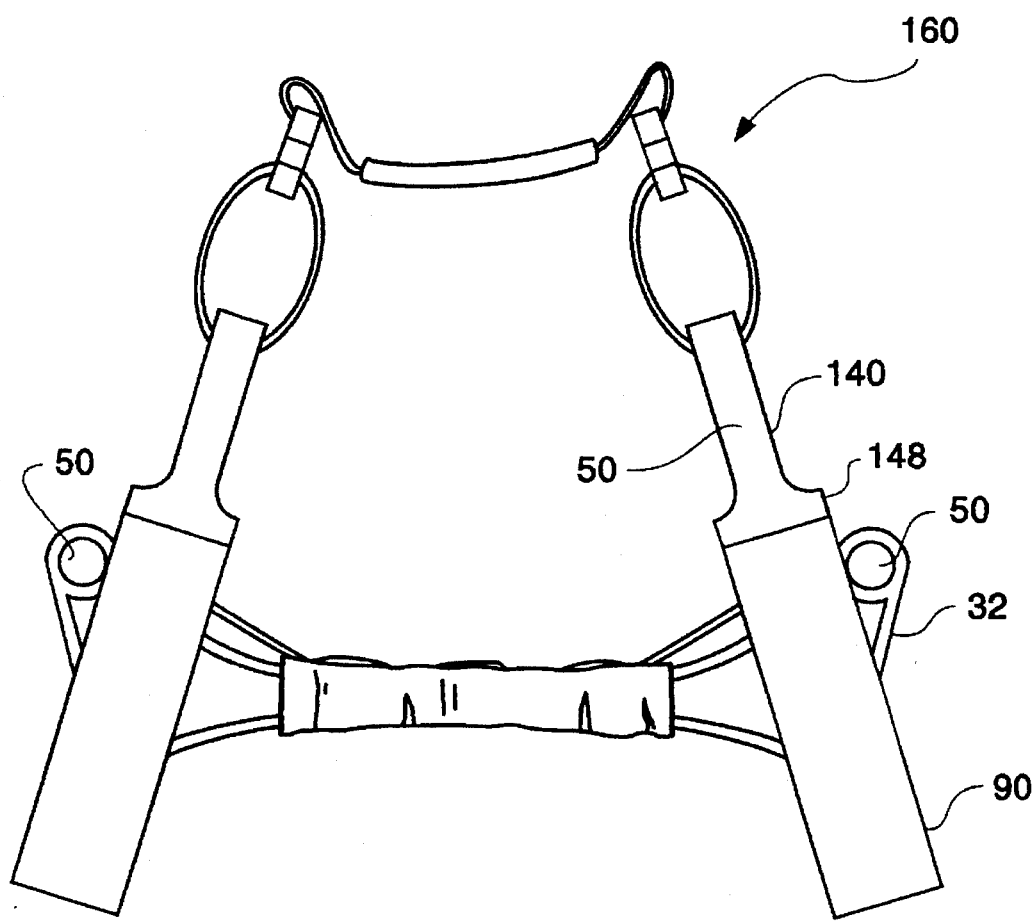
FIG. 4 is a front view of the luge sled shown in FIG. 1.
Figure 5:
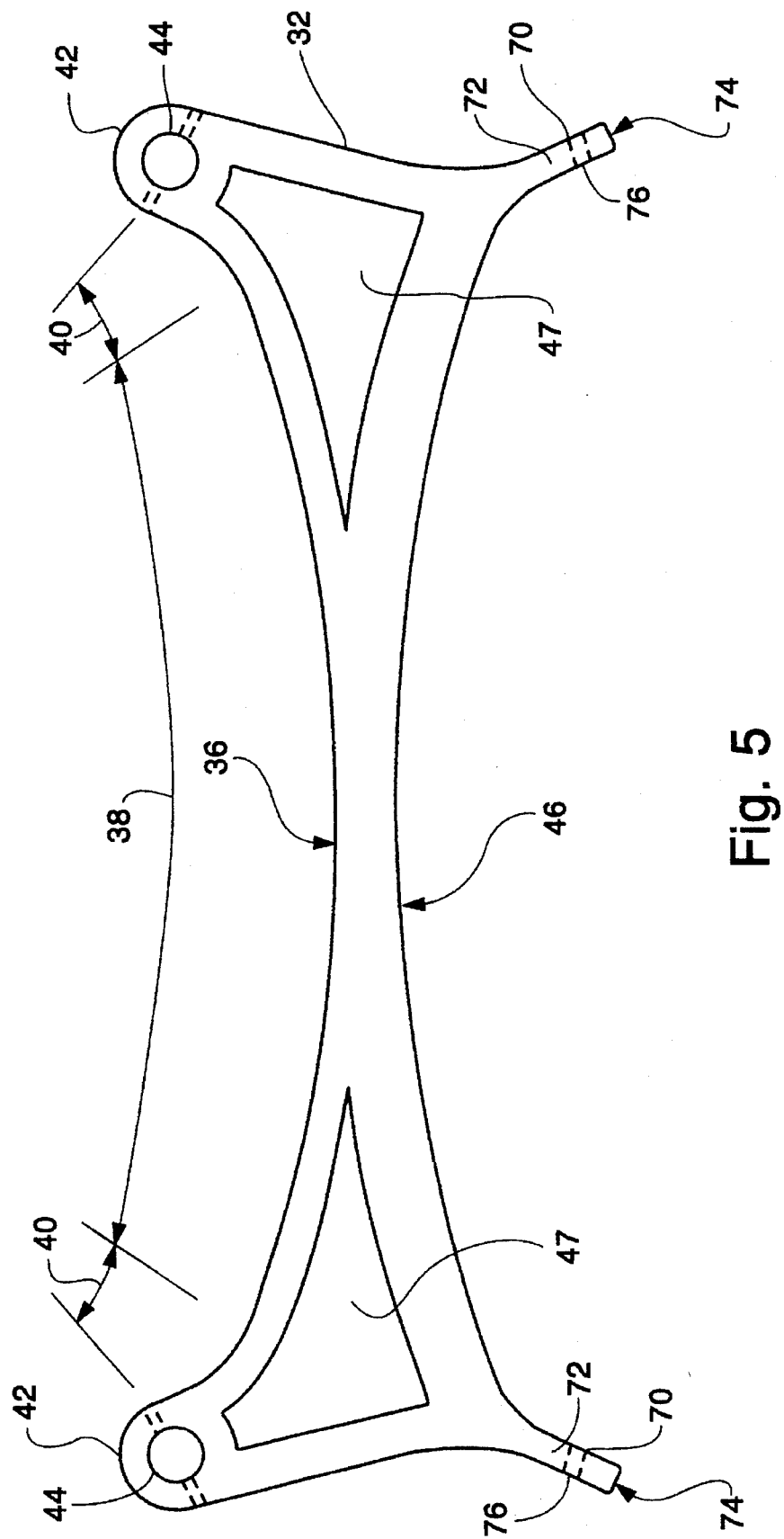
FIG. 5 is a front view of a bridge support.

As illustrated in FIG. 5, the bridge supports 32, 34 comprise a concavely arcuate upper surface 36 having an inner portion 38 of a first radius blended into outer portions 40 of a second radius smaller than the first radius. The outer portions 40 blend into and form the "ears" 42 of the sled. The concavely arcuate upper surface 36 of the bridges provides a smooth, comfortable contour for the rider 22 to lie against. The raised ears 42 formed by the arcuate outer portions 40 provide lateral support to the rider, thereby allowing the rider 22 to comfortably withstand forces caused by lateral accelerations, such as those encountered during cornering. In the illustrated embodiment, the height from the top of the ears 42 to the bottom of the upper surface 36 is about 3¼ inches. As can be seen in FIG. 4, the width of the ears 42 on the bridge supports are never wider than the width of the outside edges of the runners 90 positioned thereunder. This is beneficial in that it eliminates laterally-extending protrusions which may contact foreign objects when the sled 20 is passing in close proximity to such foreign objects.

The front and rear bridge supports 32, 34 are interconnected via stabilizer bars 50 positioned through apertures 44 in the ears 42 of the bridge supports. In the illustrated embodiment, the stabilizer bars 50 are pinned to the rear bridge support 34 and are slidably engaged into the front bridge support 32. More specifically, roll pins 52 are inserted through the ears 42 and associated apertures 44 and through the stabilizer bars 50 to secure the stabilizer bars 50 within the rear bridge support 34. The roll pins 52 are angled to about 35° below horizontal and allow pivoting of the stabilizer bar relative to the bridge support. The front portion 53 of the stabilizer bars 50 merely rests within the apertures 44 in the front bridge support 32, and therefore can slide and rotate relative to the front bridge support 32. Such ability to slide and rotate relative to the bridge support is beneficial in that it significantly decreases the effort required to steer the sled.

Figure 6:
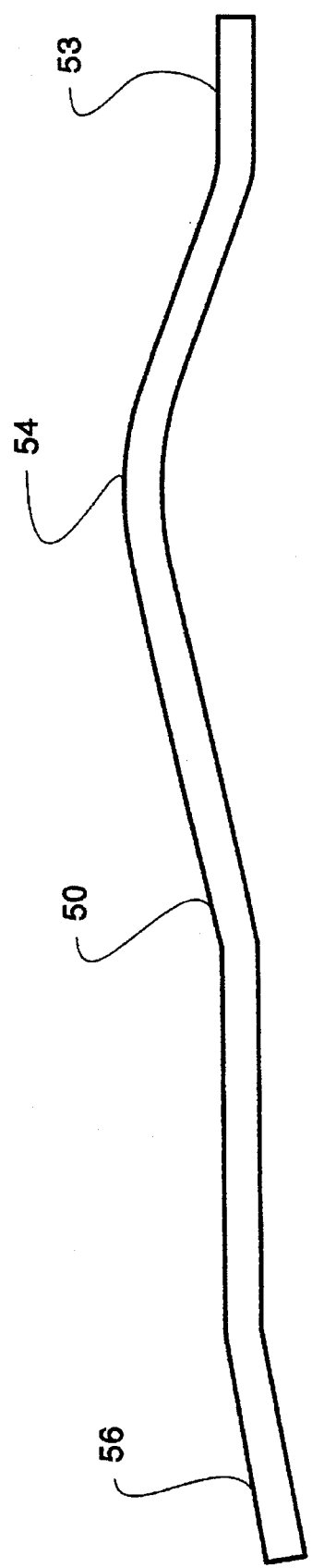
FIG. 6 illustrates a stabilizer bar of the present invention.

Referring to FIG. 6, the stabilizer bars 50 of the illustrated embodiment comprise solid aluminum tubing having a ⅝-inch outer diameter. In order to reduce manufacturing costs, the stabilizer bars 50 are preferably identical to each other. The stabilizer bars 50 include an arcuate segment 54 in a mid portion thereof which provides for greater clearance for the rider's hips. The rear portions 56 of the stabilizer bars 50 are bent slightly inward and downward for comfort to the rider's shoulders.

Figure 8:
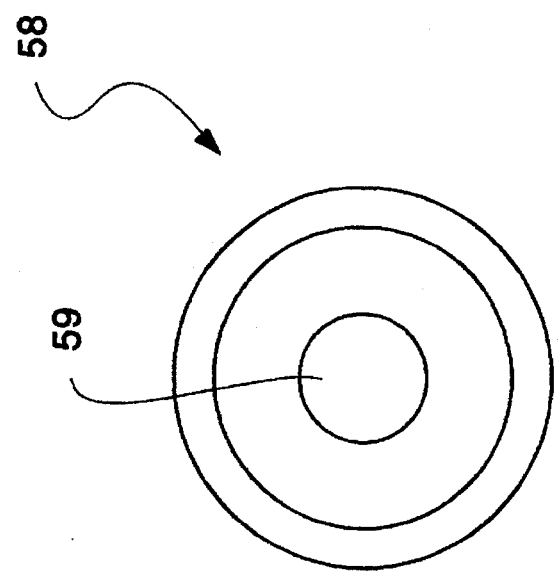
FIG. 8 is an end view of the elastomeric bumper shown in FIG. 7.
Figure 7:
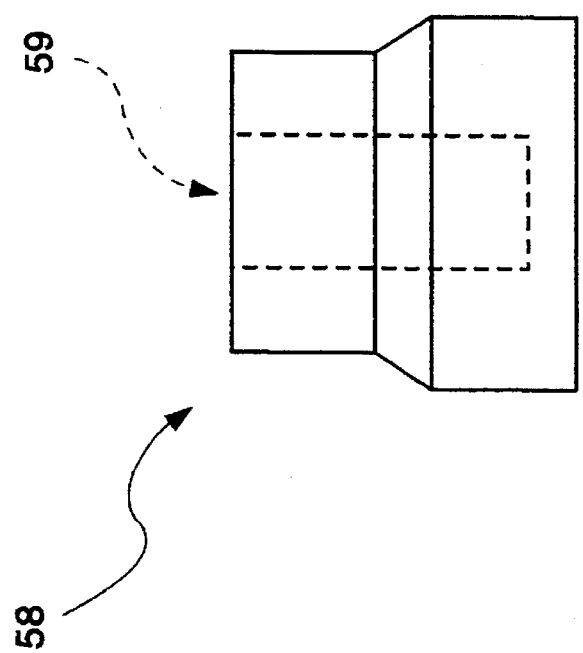
FIG. 7 is a side view of an elastomeric bumper of the present invention.

Referring to FIGS. 7 and 8, the rear portions 56 of the stabilizer bars 50 are provided with elastomeric bumpers 58 to cushion incidental contact of the stabilizer bars 50 against foreign objects. The bumpers 58 each include a cylindrical recess 59 for insertably receiving the stabilizer bars 50. In the illustrated embodiment, such elastomeric bumpers 58 are bonded to the stabilizer bars 50 and comprise neoprene rubber having a durometer of about 25.

To provide support to the rider, a seat 60 is suspended between the stabilizer bars 50 utilizing seat webbing 62. The seat 60 comprises a rectangular sheet of PVC nylon-coated canvas having a plurality of nylon grommets 64 forming holes around the perimeter thereof. The seat 60 is folded back onto itself around the perimeter to provide enhanced strength in the area of the grommets 64. The seat webbing 62 is an appropriately-sized rope which is looped through the grommets 64 and around the stabilizer bars 50 around the perimeter of the seat 60, to thereby suspend the seat 60 between the stabilizer bars 50.

Figure 9:
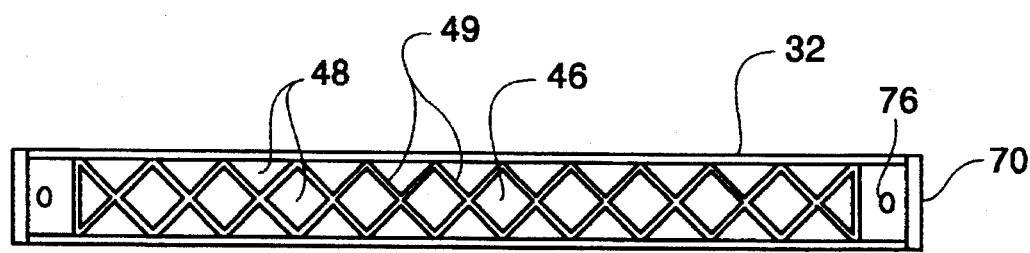
FIG. 9 is a bottom view of a bridge support of the present invention.

Similar to the upper surfaces, the lower surfaces 46 of the bridge supports 32, 34 are concavely arcuate in order to transfer the weight of the rider 22 to mounting bosses 70 positioned on either side of the bridge supports. Referring to FIG. 9, the lower surface 46 comprises a plurality of reinforcing ribs 49 in a generally criss-cross pattern. The reinforcing ribs 49 provide stiffness to the bridge without adding significantly to the weight of the bridge support. A solid panel 47 is positioned between the upper surface 36 and the lower surface 46 to provide further stiffness to the bridge support. The mounting bosses 70 are generally rectangular in cross-section, thereby defining four side surfaces 72 and an end surface 74 as best illustrated in FIG. 5. A cylindrical aperture 76 extends through each mounting boss to allow interconnection of the support structure 30 to the runners 90. In the illustrated embodiment, the mounting bosses 70 are about 2 inches wide and ¼ inch thick. The mounting bosses 70 are angled to about 25° from vertical to angle the associated runners 90 and allow for steering of the sled.

Figure 11:
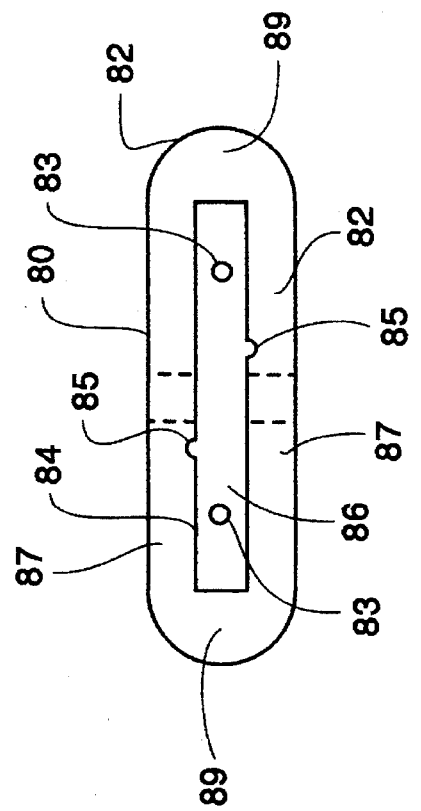
FIG. 11 is a top view of the elastomeric bushing illustrated in FIG. 10.
Figure 10:
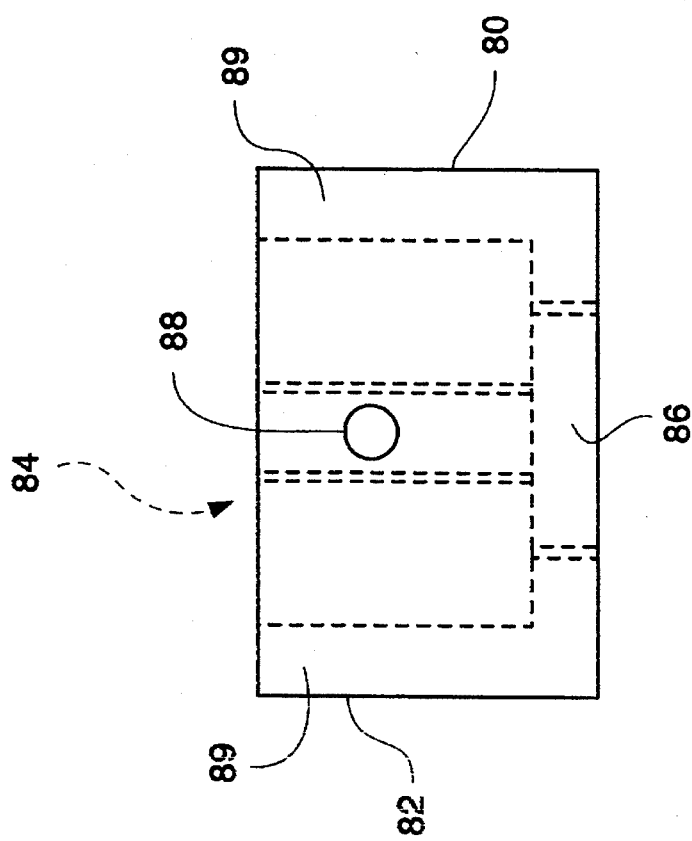
FIG. 10 is a side view of an elastomeric bushing of the present invention.
Figure 12:
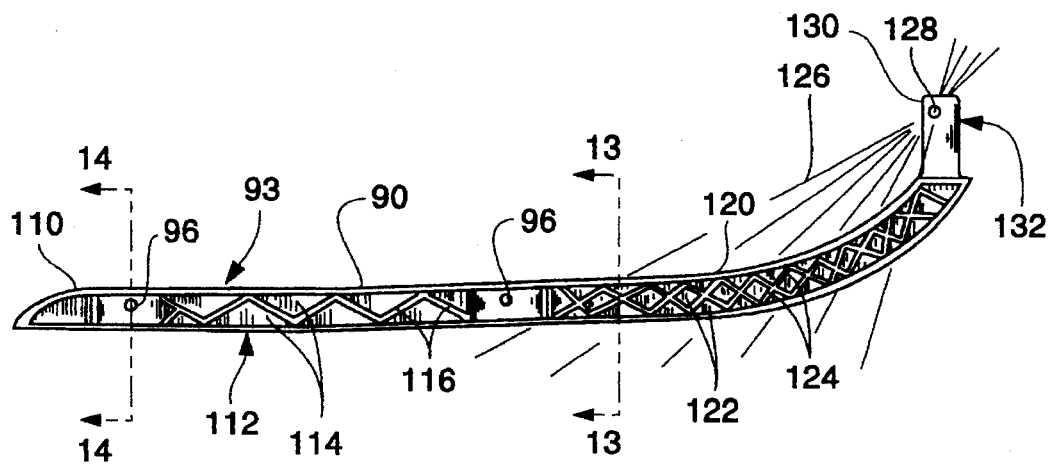
FIG. 12 is a side view of a runner embodying the present invention.
Figure 13:
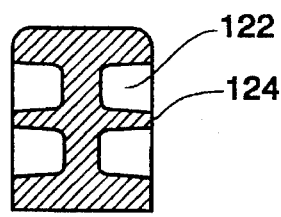
FIG. 13 is a section view taken along line 13—13 in FIG. 12.
Figure 14:
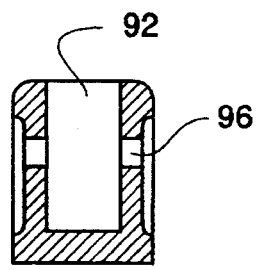
FIG. 14 is a section view taken along line 14—14 in FIG. 12.

Elastomeric bushings 80 are dimensioned to be positioned over the ends of each of the mounting bosses 70 of the bridge supports. As illustrated in FIGS. 10 and 11, each elastomeric bushing includes a body portion 82 having a generally rectangular recess 84 form therein. The rectangular recess 84 is dimensioned to insertably receive a mounting boss 70 and thereby substantially enclose the side surfaces 72 of the mounting boss 70 around the perimeter thereof. The front and rear walls 89 are approximately twice as thick as the side walls 87 to provide for easier turning of the sled. The rectangular recess 84 terminates at an end portion 86 which substantially encloses the end surface 74 of the mounting boss. The exterior surface of each bushing is generally oval in cross section, having a length of about 2¾ inches and a width of about ¾ inches. The elastomeric bushing 80 further includes two axially-aligned cylindrical apertures 88 through two opposing walls of the body portion 82. Such two axially-aligned cylindrical apertures 88 are positioned to be in alignment with the cylindrical aperture 76 in the mounting boss 70 when the elastomeric bushing 80 is properly positioned on the mounting boss 70.

The bushings 80 further include holes 83 through the end portion 86. The holes 83 facilitate insertion of the bushings 80 into the cavities 92 in the runners 90 by allowing air to escape therethrough. Grooves 85 are provided in the interior recess 84 of the bushing to facilitate insertion of the mounting boss 70 into the recess 84 by allowing escape of air therethrough.

Referring to FIGS. 12–16, each runner 90 of the illustrated embodiment includes two cavities 92 in a top surface 93 thereof for insertably receiving a mounting boss 70 and associated elastomeric bushing 80. The cavities 92 are at least partially defined by side walls 94 which include cylindrical apertures 96 therethrough. When properly assembled with the mounting boss 70 and associated elastomeric bushing 80, the cylindrical apertures 96 in the side walls 94 of the runner 90 are aligned with the cylindrical apertures 76, 88 in the mounting boss 70 and elastomeric bushing 80, thereby allowing the insertion of a securing member therethrough. In the illustrated embodiment, the securing member comprises a threaded bolt 100 which is fastened in position utilizing a capped nut 102. A capped nut 102 is preferred due to its limited thread on distance, thereby providing limited compressive forces on the side walls 94 of the runners 90. Such compressive forces can adversely affect the steering performance of the sled by constraining relative movement between the runner 90 and the mounting boss 70. Other types of securing members which limit compressive forces may also be utilized, such as shoulder bolts, sleeve bushings and the like.

Due to the angled nature of the mounting bosses 70, when the runners 90 are mounted to the bridge supports, the runners 90 will be tilted at an angle approximately equal to the angle of the mounting bosses 70 (i.e., about 25°). Such angle, in combination with other features of the illustrated embodiment, has been found to provide enhanced handling characteristics to the sled.

The runners 90 of the illustrated embodiment are injection molded out of a moldable material, such a plastic, epoxy, or other suitable material. In the described embodiment, the moldable material comprises a fiber-reinforced plastic, such as Xenoy (a trademark of General Electric Co.) having about 30% glass fibers. For ease of manufacturing, and to make the runners interchangeable, the runners are preferably identical to each other.

The runners 90 can be divided into a rear segment 110, an intermediate segment 120 and a front segment 130. The rear segment 110 includes the above-described cavities 92 for interconnecting the runners 90 to the support structure. The running surface 112 of the rear segment 110 is slightly convexly radiused to a radius of about 800 inches. Such radiused running surface 112 provides enhanced maneuverability to the sled. The rear segment has a generally I-beam configuration which provides enhanced runner stiffness and low weight. The sides of the rear segment 110 include reinforcing ribs 116 in a generally zig-zag pattern. The reinforcing ribs 116 provide vertical and lateral stiffness to the rear segment 110, without adding significantly to the weight of the runner 90.

The intermediate segment 120 of the runners 90 gradually curves upwardly from a radius of about 400 inches to a radius of about 15.5 inches. The sides of the intermediate segment 120 are provided with reinforcing ribs 124 in a generally criss-cross pattern. In the illustrated embodiment, every other forwardly-angled rib defines a rib axis 126 which collectively intersect at a common point 128. Such orientation of the ribs provides enhanced stiffness to the sled, especially for loads applied at the common point. In the illustrated embodiment, such common point 128 is positioned on the front segment 130 of the runners 90 at the location where the steering harness 160 is secured to the runners 90. It has been found that such an orientation of the ribs 124 provides enhanced performance characteristics to the sled.

The front segments 130 of the runners 90 extend upwardly from the ends of the intermediate segments 120. Each front segment 130 lies in the same general plane as the remaining segments of the runners 90 and, therefore, is angled inwardly to the same camber angle as the rest of the runner 90, as described above. The front segments 130 have a generally rectangular cross-section and are vertically disposed in the fore/aft direction. That is, the front surface 132 of each front segment 130 is generally parallel with a vertical plane. Such a configuration eliminates the unprotected, forwardly-protruding runner tip associated with many prior art luge designs and further provides a vertically-disposed front surface 132 which, due to its relatively large surface area, assists in protecting both the runner tips and foreign objects upon incidental contact therebetween. In the illustrated embodiment, the front segment 130 is about 4 inches tall, 2 inches wide, and ⅜ inch thick.

Figure 15:
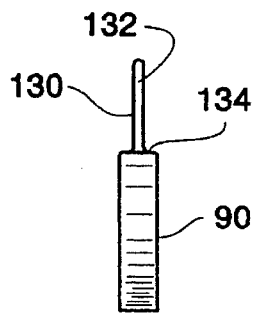
FIG. 15 is a front view of the runner illustrated in FIG. 12.
Figure 16:
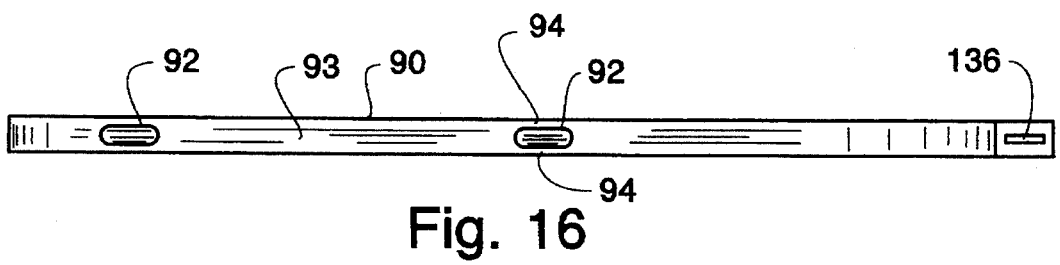
FIG. 16 is a top view of the runner illustrated in FIG. 12.
Figure 18:
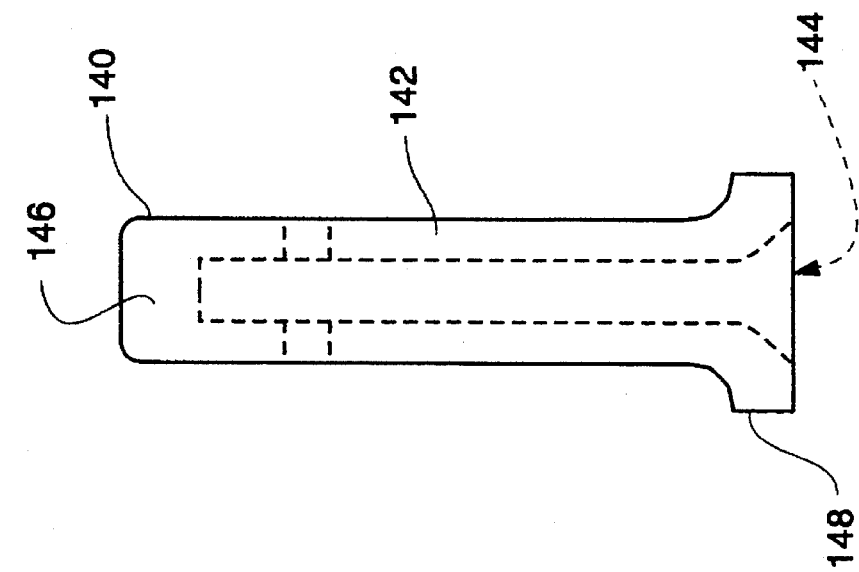
FIG. 18 is an end view of the elastomeric boot illustrated in FIG. 17.
Figure 17:
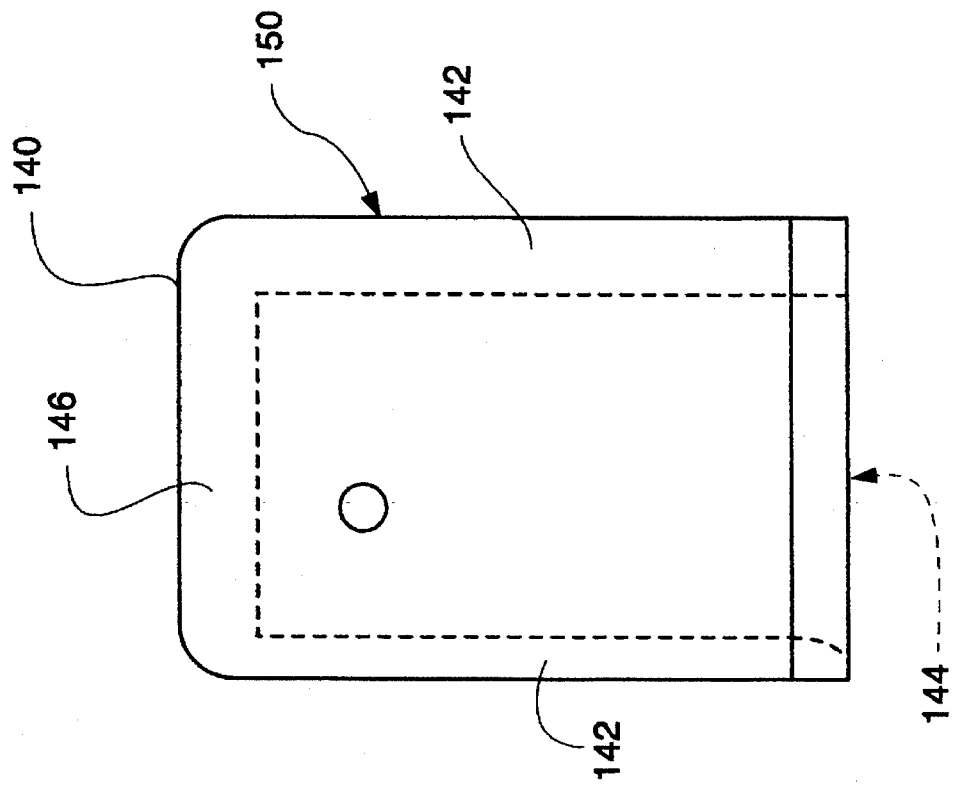
FIG. 17 is a side view of an elastomeric boot embodying the present invention.
Figure 19:
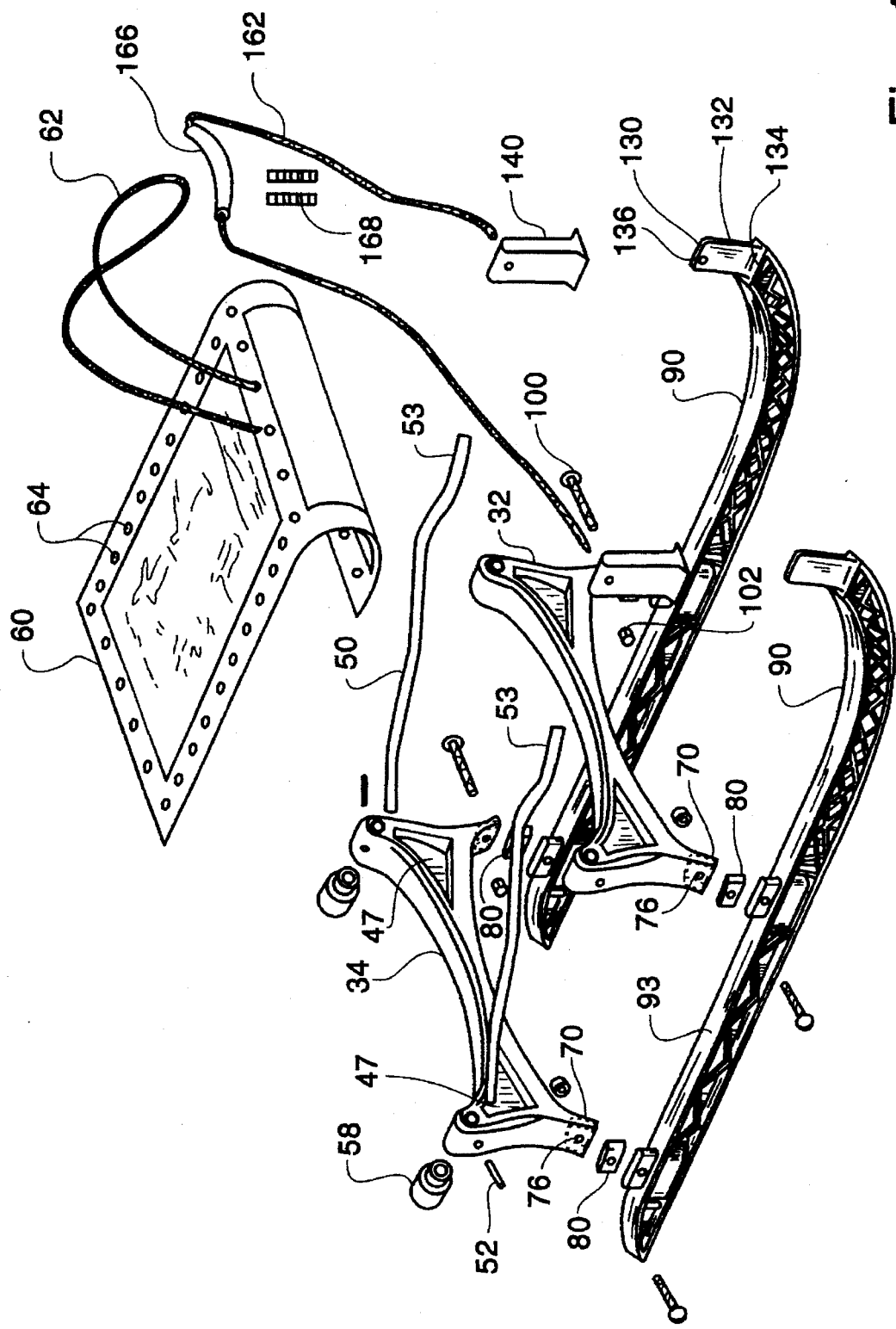
FIG. 19 is an alternative perspective assembly drawing of the luge sled with cavities formed in the bridges and mounting bosses provided on the runners.

Referring specifically to FIGS. 15–16, the width of the front segment 130 is significantly narrower than the width of the remaining segments of the runner 90. In the illustrated embodiment, the front segment 130 is about ⅜ inch wide compared to 1½ inches for the remaining segments of the runner 90. The difference in widths forms a shoulder 134 between the intermediate segment 120 and the front segment 130. The shoulder 134 provides a surface upon which the rider's legs can be rested while riding the sled. For inexperienced riders and for riders who do not have the strength or endurance to hold their legs vertically outward during the length of a ride, such shoulders 134 can provide needed support and comfort to the legs. In addition, the rider's feet may be placed upon the shoulders 134 for further ride comfort. Even for experienced riders, the shoulders 134 can provide a support to prevent the legs from excessive downward bouncing when encountering, for example, uneven terrain.

An elastomeric boot 140 is positioned around the entire outer surface of the front segment 130 of each runner 90. Referring to FIGS. 15 and 16, the elastomeric boot 140 comprises a body portion 142 having a rectangular recess 144 formed therein for insertably receiving the front segment 130 of the runner 90. An end portion 146 of the elastomeric boot 140 covers the end surface 136 of the front segment 130. The elastomeric boot 140 is further provided with a lower flange portion 148 which, when positioned over the front segment 130 of the runner 90, rests flush against the shoulder 134 on the runner 90. The elastomeric boot 140 of the illustrated embodiment comprises a soft foam rubber, such as closed cell rubber, having a durometer of about 25.

The elastomeric boot 140 provides several useful functions. First, the lower flange portion 148 works in conjunction with the shoulder 134 to provide a surface upon which the rider's legs and/or feet can be supported. As noted above, this feature is particularly useful for novice riders who may not have the strength and/or endurance to maintain the proper leg position, especially during a long ride. The end portion 146 of the elastomeric boot 140 provides padding to the end surface 136 of the front segment 130. This padding can cushion contact between the end surface 136 of the front segments 130 and foreign objects. Further, such padding facilitates leaning of the sled 20 against a wall without causing damage to or marking the wall. The boot 140 also provides cushion to the rider's leg to make turning of the sled 20 (e.g., by applying lateral force to the front segment 130 utilizing the legs) more comfortable. When assembled, the front surface 150 of the elastomeric boot 140 protrudes forwardly beyond the forward-most portion of the runner 90, thereby providing cushioned contact with foreign objects.

The steering harness 160 comprises a steering rope 162 which is looped through harness holes 164 in the elastomeric boots 140 and the front segments 130 of the runners 90. The mid-portion of the rope 162 passes through a tubular steering handle 166 which provides improved grip so that the rider can pull harder on the steering rope. In the illustrated embodiment, the steering handle 166 is maintained centered on the steering rope 162 by knots tied in the steering rope 162 on either end of the steering handle 166. In order to provide length adjustment to the steering rope 162, the steering harness 160 is provided with steering ring adjusters 168. The steering ring adjusters 168 of the described embodiment comprise a relatively rigid plastic member, such as nylon, having three holes 170 extending therethrough. The steering rope 162 passes through two of the holes, through the harness holes 164, and back through the third hole where it is secured by tying a knot in the end of the rope 162. Such a configuration allows the effective rope length to be adjusted to accommodate riders of different sizes.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A sled comprising:
   at least two runners, each of said runners having front and rear ends and side edges;
   a support structure including at least two separate bridges, said bridges extending between said runners and spaced relative to each other along said runners between said front and rear ends of said runners for supporting a sled rider;
   cavaties formed into one of said bridges and said runners;
   mounting bosses positioned within said cavities in one-to-one relation, each of said mounting bosses interconnected with the other of said bridges and said runners and including a side surface and an end surface;
   elastomeric bushings positioned between said cavities and mounting bosses in one-to-one relation, each of said elastomeric bushings including a body portion having a front wall extending forwardly toward said front end of the corresponding runner and at least one side wall extending sideways toward one of said side edges of the corresponding runner, said forwardly extending front wall being thicker than said sideways extending side wall; and a securing means for interconnecting corresponding ones of said cavities, elastomeric bushings and mounting bosses and for allowing relative movement between corresponding ones of said bridges and said runners.

2. A sled, as claimed in claim 1, wherein said front wall is at least about twice as thick as said side wall.

3. A sled, as claimed in claim 2, wherein each of said elastomeric bushing comprises two side walls extending sideways toward said side edges of the corresponding runner and further comprises a rear wall extending rearwardly toward said rear end of the corresponding runner, and wherein said forwardly extending front wall and rearwardly extending rear wall are each thicker than each of said two sideways extending side walls.

4. A sled, as claimed in claim 1, wherein each of said elastomeric bushing further includes an end portion integral with said body portion, said end portion having holes therethrough.

5. A sled, as claimed in claim 1, wherein said cavities are integrally formed into said runners and said mounting bosses are integrally formed with and secured to said bridges 6. A sled, as claimed in claim 1, wherein said each of said cavities is defined by sidewalls, and wherein said securing means comprises an elongated member which extends through apertures in each of said sidewalls of said cavities, said elastomeric bushings, and said mounting bosses to interconnect said runners to said bridges, said securing means including means for limiting compressive forces on said sideways extending sidewalls.

7. A sled, as claimed in claim 6, wherein said elongated member comprises a threaded rod having a head on one end said securing means further comprising a capped nut threadedly secured to the other end of said threaded rod.

8. A sled, as claimed in claim 1, wherein each of said mounting bosses, cavities and elastomeric bushings are elongated and in substantial alignment with the corresponding runner.

9. A sled, as claimed in claim 1, wherein said elastomeric bushings have a durometer reading of from about 50 to about 90.

10. A sled comprising:

at least two runners, wherein each of said runners substantially entirely comprises a molded fiber-reinforced material, each of said runners having front and rear ends, side edges and a first plurality of ribs integrally formed with each of said runners and positioned in a zig-zag pattern in at least an intermediate segment of said runners, said intermediate segment being rearward said front end;

a support structure including at least two separate bridges, said bridges extending between said runners and spaced relative to each other along said runners and rearward said intermediate segment of each of said runners; and cavities formed in one of said runners and bridges with elastomeric bushings interposed between each of said bridges and said runners in said cavities to allow relative movement therebetween.

11. A sled, as claimed in claim 10, wherein said molded fiber-reinforced material comprises a fiber-reinforced plastic.

12. A sled, as claimed in claim 10, wherein said molded fiber-reinforced material comprises a glass fiber-reinforced plastic.

13. A sled, as claimed in claim 10, wherein said bridges substantially entirely comprise a molded fiber-reinforced plastic.

14. A sled, as claimed in claim 13, wherein at least one of said bridge comprises a molded glass fiber-reinforced plastic.

15. A sled, as claimed in claim 13, wherein at least one of said bridge comprises a lower surface, said at least one of said bridges having integrally formed reinforcing ribs extending from said lower surface.

16. A sled, as claimed in claim 13, wherein said bridges include an upper surface and a lower surface, and wherein at least one of said bridges comprise a solid panel interconnecting said upper surface with said lower surface.

17. A sled, as claimed in claim 10, wherein each of said runner has a substantially identical I-beam cross-section along at least a portion thereof.

18. A sled, as claimed in claim 17, wherein said I-beam cross-section of said runners includes a central upstanding section, and wherein said plurality of integrally formed ribs of each runner protrude from said central upstanding section.

19. A sled, as claimed in claim 10, wherein rib axes are defined along a longitudinal extent of each integrally formed rib of said runners, and wherein a plurality of said runners, and wherein a plurality of said rib axes intersect at a common point.

20. A sled, at claimed in claim 19, wherein said common point is positioned on a front portion of said runners.

21. A sled, as claimed in claim 10, wherein said runners each include a front segment having a front surface which is generally vertically disposed.

22. A sled, as claimed in claim 21, further comprising a front elastomeric member positioned adjacent said front surface.

23. A sled, at claimed in claim 22, wherein said front segment includes a side surface and an end surface, and wherein said front elastomeric member includes a side portion which covers said side surface of said front segment.

24. A sled, at claimed in claim 23, wherein said elastomeric member includes an end portion which covers said end surface of said front segment.

25. A sled, as claimed in claim 10, wherein each runner further includes a supporting shoulder adjacent a front segment thereof.

26. A sled, as claimed in claim 10, wherein each of said runners comprises a second plurality of integrally formed ribs positioned in a generally zig-zag pattern at least in said intermediate segment of said runner, wherein said second plurality of ribs criss-crosses said first plurality of ribs at least in said intermediate segment of said runners.

27. A sled comprising:

at least two runners having front and rear ends; and a support structure including first and second bridges and at least two stabilizer bars pivotally secured to said first bridge via pin members and slidably engaged with said second bridge, said pin members being angled between about 5° and about 85° relative to a horizontal plane, said bridges extending between said runners and spaced relative to each other along said runners between said front and rear ends.

28. A sled, as claimed in claim 27, wherein said pin members are angled between about 20° and about 50° relative to a horizontal plane.

29. A sled, as claimed in claim 28, wherein said pin members are angled about 35° relative to a horizontal plane.

30. A sled as claimed in claim 27, further comprising a rear elastomeric bumper on a rear portion of each of said stabilizer bars.

31. A sled comprising:

At least two runners having front, intermediate and rear segments and side edges, said front segment extending substantially vertically upward from the front end of said intermediate segment at the forwardmost end of each of said runners for receiving lateral forces applied by a user's legs in turning the sled, and said front segment adjoining said intermediate segment to form a forwardly extending outwardly protruding and substantially horizontal supporting shoulder from the front segment for supportably receiving a user's legs in each of said runners, said front segment and the front end of the intermediate segment extending longitudinally of said sled; and a support structure including at least two separate bridges, said bridges extending between said runners and spaced relative to each other along said runners.

32. A sled comprising:

at least two runners having front, intermediate and rear segments and side edge, said front segment extending substantially vertically upward from said intermediate segment of each of said runners, and said front segment adjoining said intermediate segment to form an outwardly protruding substantially horizontal supporting shoulder in each of said runners;

a support structure including at least two separate bridges, said bridges extending between said runners and spaced relative to each other along said runners; and elastomeric boots positioned on said front segments of said runners in one-to-one relation, each of said elastomeric boots having lower flange portions contacting said supporting shoulder of the corresponding runner.

33. A sled comprising:

at least two runners, each of said runners comprising molded, fiber reinforced material and having front and rear ends, and having integrally formed zig-zag ribs extending sidewardly therefrom;

a support structure including two separate bridges, wherein each of said bridges extends between and is interconnected via a mounting boss and receiving cavity with each of said runners and substantially entirely comprises a molded fiber-reinforced material, each of said bridges including a bottom surface having a plurality of integrally formed reinforcing ribs extending downwardly from said bottom surface for stiffening said bridge, said ribs being positioned in a zig-zag pattern; and elastomeric bushings interposed between each of said bridges and said runners to allow relative movement therebetween, and said cavities formed into one of said runners and bridges.

* * * * *